(12) United States Patent
Videv et al.

(10) Patent No.: US 11,296,798 B2
(45) Date of Patent: Apr. 5, 2022

(54) OPTICAL WIRELESS COMMUNICATIONS SYSTEM

(71) Applicant: The University Court of the University of Edinburgh, Edinburgh (GB)

(72) Inventors: Stefan I. Videv, Edinburgh (GB); Harald Haas, Edinburgh (GB); Sovan Das, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 16/616,708

(22) PCT Filed: May 31, 2018

(86) PCT No.: PCT/GB2018/051489
§ 371 (c)(1),
(2) Date: Nov. 25, 2019

(87) PCT Pub. No.: WO2018/220380
PCT Pub. Date: Dec. 6, 2018

(65) Prior Publication Data
US 2020/0092012 A1 Mar. 19, 2020

(30) Foreign Application Priority Data
May 31, 2017 (GB) .................................... 1708643

(51) Int. Cl.
*H04B 10/06* (2006.01)
*H04B 10/69* (2013.01)
(Continued)

(52) U.S. Cl.
CPC ........... *H04B 10/69* (2013.01); *H04B 10/116* (2013.01); *H04B 10/516* (2013.01)

(58) Field of Classification Search
CPC ...... H04B 10/60; H04B 10/69; H04B 10/116; H04B 10/516; H04B 10/50; H04B 10/40;
(Continued)

(56) References Cited

U.S. PATENT DOCUMENTS

| 2007/0211250 A1* | 9/2007 | Teichmann | ........... G01J 3/0205 356/328 |
| 2010/0008671 A1* | 1/2010 | Pratt | .................... H04B 10/506 398/83 |

(Continued)

OTHER PUBLICATIONS

International Preliminary Report on Patentability for PCT/GB2018/051489, dated Dec. 12, 2019, 8 pages.
(Continued)

*Primary Examiner* — Hibret A Woldekidan
(74) *Attorney, Agent, or Firm* — Dority & Manning, P.A.

(57) ABSTRACT

There is a photovoltaic (PV) panel 10 including an array of photovoltaic (PV) elements (12). Each PV element (12) is stand alone and can be electronically addressed individually. The PV panel (10) also includes a number of spectral filters (14), in this example, a red filter (14r), a green filter (14g) and a blue filter (14b) arranged over some of the PV elements (12) to filter out the red, green and blue spectral components from white (combined red, green and blue) light emitted from a red-green-blue (RGB) transmitter. Data can be transmitted by modulating the spectral components of the RGB transmitter such that the data in each of the spectral components can be recovered from the electrical signal generated by the PV elements (12).

16 Claims, 4 Drawing Sheets

(51) Int. Cl.
*H04B 10/116* (2013.01)
*H04B 10/516* (2013.01)

(58) Field of Classification Search
CPC ............ H04B 10/1123; H04B 10/1141; H01L 31/02162; Y02E 10/52
USPC .................. 398/202, 172, 115, 130, 140, 207
See application file for complete search history.

(56) References Cited

U.S. PATENT DOCUMENTS

| | | | |
|---|---|---|---|
| 2012/0129269 A1* | 5/2012 | Choi ......................... | G01J 3/02 436/164 |
| 2016/0093269 A1* | 3/2016 | Buckley .................... | G09F 9/30 345/501 |
| 2016/0268467 A1* | 9/2016 | Mills ................... | H01L 31/0547 |
| 2016/0294472 A1* | 10/2016 | Palmer ................. | H04B 7/0617 |
| 2018/0219623 A1* | 8/2018 | Bitra ................... | H04B 10/116 |

OTHER PUBLICATIONS

International Search Report and Written Opinion for PCT/GB2018/051489, dated May 9, 2018, 10 pages.
Wang et al, "On the Design of a Solar-Panel Receiver for Optical Wireless Communications with Simultaneous Energy Harvesting", Journal on Selected Areas in Communication, vol. 33, No. 8, Aug. 2015, pp. 1612-1623.

* cited by examiner

OPTICAL WIRELESS COMMUNICATIONS SYSTEM

PRIORITY CLAIM

This application is based upon and claims the right of priority under 35 U.S.C. § 371 to International Application No. PCT/GB2018/051489 filed on May 31, 2018, which claims priority to GB Application Serial No. 1708643.0 filed May 31, 2017, each of which is incorporated by reference herein in its entirety.

FIELD

The present disclosure relates to an optical wireless communications system, in particular but not exclusively, a visible light communication (VLC) system.

BACKGROUND

There is predicted to be a significant increase in the amount of data used in wireless communications, such as in cellular networks and Wi-Fi networks. So-called 4G technology has been widely deployed in cellular telecommunication networks, which has enabled a significant increase in data transmission rates sufficient to enable mobile devices to receive high definition videos, among other data-heavy applications.

It is expected that the volume of data being transmitted over existing RF networks, such as cellular networks and Wi-Fi networks, will continue to increase, which has led to the prediction of a "spectrum crunch", in which the radiofrequency (RF) spectrum available for traditional wireless communication methods is no longer sufficient to carry the required volume of data.

Visible light communication (VLC) and other optical communication techniques (for example non-visible light communication such as infrared communication) have emerged as a potential candidate to address the spectrum crunch. Compared with RF communication, VLC operates at an unregulated part of the electromagnetic spectrum and is intrinsically safe to be used in electromagnetic interference (EMI) sensitive environments, such as aircraft, hospitals and oil refineries. VLC and other optical wireless communication techniques may provide a method to enable higher bandwidth data transmission than is currently possible using RF techniques.

Implementation of these techniques has been achieved previously by employing modulation techniques for encoding information into a signal which is used to modulate the output of an optical transmitter.

An example of a modulation technique which can be used for transmitting orthogonal subcarriers is orthogonal frequency domain multiplexing (OFDM), which has been implemented in a number of optical wireless communications systems. OFDM is regarded as a practical realisation of multiple subcarrier modulation (MSM) and is a parallel data transmission scheme in which high data rates can be achieved by transmitting orthogonal subcarriers, see e.g. Elgala, H, Mesleh, R & Haas, H 2011, *"Indoor Optical Wireless Communication: Potential and State-of-the-Art"*, *IEEE Communications Magazine*, the contents of which is hereby incorporated by reference in its entirety. There are a number of different ways to implement OFDM in optical wireless communications systems, including by way of example only, DC biased optical OFDM (DCO-OFDM), asymmetrically clipped optical OFDM (ACO-OFDM), enhanced ACO-OFDM (eACO-OFDM), layered ACO-OFDM (LACO-OFDM), pulse amplitude modulation discrete multitone (PAM-DMT) based OFDM, enhanced PAM-DMT (ePAM-DMT) based OFDM, unipolar OFDM (U-OFDM), enhanced unipolar OFDM (eU-OFDM), flipped OFDM (Flip-OFDM), spectrally and energy efficient OFDM (SEE-OFDM), reverse polarity optical OFDM (RPO-OFDM), polar OFDM (P-OFDM), spatial-OFDM, asymmetrically and symmetrically clipped optical OFDM (ASCO-OFDM), spectrally factorized optical OFDM (SFO-OFDM), position modulation OFDM (PM-OFDM), asymmetrically clipped DC biased optical OFDM (ADO-OFDM), and hybrid asymmetrically clipped optical OFDM (HACO-OFDM).

The above noted OFDM techniques have been reviewed in Islim, M & Haas, H 2016, *"Modulation Techniques for Li-Fi"*, *ZTE Communications*, the contents of which is hereby incorporated by reference in its entirety. In addition, other modulation techniques such as single carrier modulation (SCM) and other multicarrier modulation (MCM) techniques are described in Islim, M & Haas, H 2016, *"Modulation Techniques for Li-Fi"*, *ZTE Communications*.

A number of published articles and patent documents describe some of the above techniques in further detail. U-OFDM is described in published Patent applications GB2496379, WO/2013/064835 and WO/2015/036786 and in "Novel Unipolar Orthogonal Frequency Division Multiplexing" by D. Tsonev, S. Sinanović and H. Haas, *Proc. Of the Vehicular Technology Conference (VTC Spring)*, IEEE, Yokohama, Japan, IEEE, May 6-9 2012. ACO-OFDM is described by J. Armstrong et. al. in "Power efficient Optical OFDM", *Electronics Letters*, vol. 42, no. 6, pp. 370-372, 16 Mar. 2006. PAM-DMT is described by S. C. J. Lee et. al. in "PAM-DMT for Intensity Modulated and Direct-Detection Optical Communication Systems", *IEEE Photonics Technology Letters*, Vol. 21, no. 23, pp. 1749-1751, December 2009. Flip-OFDM is described by N. Fernando et. al. in "Flip-OFDM for Optical Wireless Communications" in *Information Theory Workshop (ITW)*, IEEE, Paraty, Brazil: IEEE, Oct. 16-20, 2011, pp. 5-9. The contents of all of the above documents are hereby incorporated by reference in their entirety as if set out in full in the present application.

There are a number of issues with deploying VLC-enabled communications systems on a large scale. Complexity, power consumption requirements and/or cost may be relevant factors for determining whether widespread deployment of VLC-enabled communications systems can be achieved.

WO 2015/082907 A2 (The University Court of the University of Edinburgh), the disclosure of which is hereby incorporated by reference in its entirety, describes a receiver system having at least one receiver for receiving optical communications signals that encode or transmit information; wherein the receiver system is adapted to produce one or more electrical signals from the received optical signal and/or from ambient light such that the receiver system is usable as a source of electrical power and the encoded or transmitted information from the received optical communication signal is recovered or recoverable from the electrical signal(s).

SUMMARY

According to an example of the present disclosure there is provided a receiver system for converting a wireless optical signal comprising a plurality of spectral components encoded with information into an electrical signal. The receiver system may comprise a plurality of receivers for converting the optical signal into the electrical signal. The receiver system may be configured such that at least one of the receivers detects at least one different spectral component to the spectral component(s) detected by at least one other of the receivers.

In use, the receiver system may be configured to receive a wireless optical signal that may comprise a plurality of spectral components. The receiver(s) may be configured to detect at least one spectral component. At least one receiver may be configured to detect at least one spectral component. At least one receiver may be configured to detect at least one other spectral component. At least one receiver may be configured to detect more than one spectral component, for example, a combination of spectral components. The combination of spectral components may comprise at least one spectral component detected by at least one of the other receivers. The receiver system may comprise at least one receiver for detecting one spectral component and at least one receiver for detecting more than one spectral component. At least one of the receivers may be configured to detect one or more of the spectral components so as to convert the optical signal into the electrical signal. By configuring the receivers to detect one or more of the spectral components, the receiver system may be capable of detecting more than one of the spectral components so as to allow each spectral component to transmit information to one or more of the receivers in the receiver system. By providing a plurality of spectral components, the data transmission rate achievable may be greater than if only one spectral component is provided.

The receiver system may comprise a spectral filtering system for allowing one or more of the spectral components to be detected by at least one of the receivers.

The spectral filtering system may be configured to permit at least one of the receivers to receive the respective different spectral components or combinations of spectral components.

The spectral filtering system may comprise at least one spectral filter for allowing transmission of a predetermined spectral component or spectral band.

The at least one spectral filter may be shaped to correspond to a detection area of the receiver.

The spectral filter may have a shape which corresponds to or is substantially the same as the shape of the detection area of the receiver. The shape may be square, rectangular, hexagonal, or the like. The at least one spectral filter may be comprised in the respective receiver.

At least one spectral filter may be mounted on or above at least one of the plurality of the receivers so as to spectrally filter the optical signal for at least one of the receivers.

The receiver system may comprise an optical element for separating at least one spectral component from at least one other spectral component of the optical signal.

The receiver may comprise a plurality of optical elements. The optical element may provide a way to spatially separate at least one spectral component, which may be encoded with a first data portion, from at least one other spectral component, which may be encoded with a second data portion, to allow the spectral components to be distinguished from each other. By separating the spectral components, the first and second data portions may be spatially separated for detection on separate receivers or detectors. The optical element may be configured to enable wave-division multiplexing (WDM). For example, the optical element may provide a way to demultiplex an optical signal comprising more than one spectral component.

The optical element may comprise an optical concentrator.

The optical element may be configured to concentrate at least one spectral component received over a first area of the optical element. The at least one spectral component of the optical signal may be directed, deflected or otherwise concentrated by the optical element to a second area smaller than the first area, which may increase the intensity or flux density of the directed, deflected or otherwise concentrated part of the optical signal.

The optical element may be configured to direct at least one spectral component of the optical signal in a first direction, and direct at least one other spectral component of the optical signal in a different second direction.

The receiver system may comprise at least one of: a dichroic mirror, beam splitter, prism and grating.

The dichroic mirror, beam splitter, prism or grating may direct at least one spectral component of the optical signal in a first direction, and direct at least one other spectral component of the optical signal in a different second direction. A person of ordinary skill in the art would appreciate that any appropriate optical element may be provided to split, divide or otherwise spatially separate spectral components of the optical signal e.g. to provide wavelength selectivity based on the relative position between at least one of the receivers and at least one of: the dichroic mirror, beam splitter, prism and grating, or indeed any other optical component capable of selectively directing two or more spectral components of an optical signal in different directions.

The optical element may be configured to direct separated spectral components to at least one of the receivers so as to collect at least one of or all of the separated spectral components of the optical signal.

The optical element may be configured to accept at least one spectral component so as to enable collection of spectral component(s) via at least one of the receivers. The optical element may be configured to reflect or reject spectral components separated from the accepted spectral components. If reflected or rejected spectral components were to escape from the receiver system, useful energy might not be captured. By directing reflected or rejected spectral components from the optical element to at least one other receiver, the optical signal collection efficiency may be increased, e.g. for energy harvesting purposes or the like.

The optical element or a plurality of optical elements may be operable to direct at least one spectral component of the optical signal to at least one of the receivers. The optical element or a plurality of optical elements may be operable to direct at least one other spectral component of the optical signal to at least one other of the receivers.

The optical element or elements may be disposed on, adjacent to, connected to or otherwise configured to permit at least one of the spectral components of the optical signal to be received by at least one of the receivers.

At least one receiver may comprise a photovoltaic element for generating the electrical signal upon activation by the optical signal.

Each receiver may comprise or be comprised in a photovoltaic panel, solar panel, or solar panel array. The receiver system may comprise a plurality of photovoltaic elements. Each photovoltaic element may define a receiver of the receiver system. Each receiver may be independently addressable so that an electrical signal generated by each receiver can be processed independently of the electrical signal generated by the other receivers. One or more or each of the receivers (and/or photovoltaic elements) may be individually addressable elements or parts of an integrated or unitary receiver or may be individual receivers, e.g. assembled or combined together.

The receiver system may be configured to simultaneously receive data or information and to generate electrical energy and/or power, e.g. for powering the receiver system and/or a device coupled or connectable to the receiver system and/or energy storage.

The receiver system may be operable in at least one of: a first mode and a second mode. In the first mode at least one of the receivers may be operable for receiving data or information from at least one of the spectral components. In the second mode, the receiver system may be operable for harvesting energy or power by converting a received signal into an electrical signal such as for energy storage or powering another component or device coupled or connectable to the receiver system and/or energy storage.

In a third mode, the receiver system may be operable in a combination of the first and second modes for simultaneously receiving information (e.g. which may be encoded by at least one of the spectral components provided by the optical signal) and energy/power harvesting. In use, the receiver system may be switched between the first and second modes, or may operate in a combination of the first and second modes.

At least one of the receivers may be individually operable or addressable to provide at least one electrical signal in response to being illuminated by at least one spectral component of the optical signal.

At least one of the receivers may be configured to individually or simultaneously receive data or information and to generate electrical energy and/or power, e.g. for powering the receiver system and/or a device coupled or connectable to the receiver system and/or energy storage.

At least one electrical signal from at least one of the receivers may be summed, combined, separated from, compared, or otherwise manipulated with respect to at least one other electrical signal from at least one other of the receivers for at least one of: harvesting energy; decoding data or information encoded by the at least one electrical signal; error correction, or the like.

By summing or combining the energy/power provided by the receivers, energy can be harvested e.g. for powering a component, self-powering the receiver system, or for energy storage e.g. in a battery, or the like. The electrical signals can be summed/combined in series, or in parallel, or in any other appropriate way so as to permit energy/power to be harvested with a desired current-voltage characteristic.

At least one receiver may have a different size, shape, dimension or area to that of at least one other receiver.

At least one receiver may have an active or light-sensitive detecting area or portion that is different to at least one other receiver. At least one spectral component may be detectable by at least one receiver and at least one other spectral component may be detectable by at least one other receiver. The proportion of receiver area assigned to the at least one receiver may be different to the proportion of the receiver area assigned to the at least one other receiver.

The relative positioning of the receivers may be adjustable for optimising detection of at least one spectral component.

The optical signal may have a spatial or intensity distribution that is dependent on the spectral component(s) in the optical signal. By adjusting the position of the receivers, the receivers may be provided in an optimum position for receiving at least one of the spectral components (e.g. for improved efficiency, or the like).

At least one of the receivers may comprise a photoactive element. The photoactive element may be configured to be responsive to at least one of the spectral components for directly generating the electrical signal.

The photoactive element may comprise or be a semiconductor material configured to produce a voltage upon receiving the optical signal. The photoactive element may comprise or be a photovoltaic panel or element. The photoactive element may comprise at least one of: a single-junction photovoltaic cell, multi-junction photovoltaic cell, organic photovoltaic cell, 3D photovoltaic cell, photovoltaic or solar concentrator, quantum dot cell, or the like.

The photoactive element may be configured to be responsive to one or more of the spectral components e.g. by having an absorption spectrum corresponding to the one or more of the spectral components. Providing a photoactive element that is responsive to one or more of the spectral components may obviate the need to provide a spectral filtering system. The photoactive element may be mounted on or connected to a conductor for allowing the electrical signal generated by the photoactive element to be conveyed to a signal processor.

At least one of the receivers may be operable to detect at least one spectral component. The at least one spectral component may comprise at least one visible spectral component.

The visible spectral components may comprise one or more of red, green and blue optical frequencies, or indeed any other visible part of the electromagnetic spectrum such as implemented in LED lighting systems, or indeed in any other appropriate type of lighting system. The visible spectral components may comprise a range of spectral frequencies, for example, as provided by a white lighting system (e.g. a white LED, or the like). One or more of the spectral components may be specified in the IEEE 802.15.7 standard. The spectral components may define a spectral range that is distinct from the spectral range defined by at least one other spectral component, or the spectral range of at least one spectral component may partially overlap with the spectral range of at least one other spectral component.

At least one of the receivers may be operable to detect at least one of the spectral component. The at least one spectral component may comprise at least one non-visible spectral component.

The optical signal may comprise at least one of: visible and non-visible electromagnetic radiation. At least one of the receivers may be responsive to visible, ultraviolet, infrared, X-ray, microwave, Terahertz, and/or gamma ray radiation.

The receiver system may comprise a processor for recovering information from an electrical signal generated by at least one of the photovoltaic elements.

The processor may comprise a demodulator. The processor may comprise circuitry and/or software for recovering or decoding information from the electrical signal.

The receiver system may comprise circuitry and/or software for performing error correction on at least one electrical signal.

The error correction may comprise comparing the at least one electrical signal with at least one other electrical signal.

The receiver system may comprise circuitry and/or software for selecting at least one electrical signal provided by at least one of the receivers. The selection may be based on at least one of: providing an optimum signal to noise ratio; detecting at least one spectral component or detecting an intensity ratio of detected spectral components; reducing the capacitance of the receivers; and removing interference from at least one of the spectral components.

The receiver system may be configured to select at least one electrical signal provided by at least one of the receivers so as to allow information or a data portion carried by said at least one electrical signal to be decoded or used. Selecting at least one electrical signal may be performed by comparing one or more electrical signal properties, such as voltage or current with a threshold. The threshold may be based on at least one of: providing the optimum signal to noise ratio; detecting at least one spectral component or detecting an intensity ratio of detected spectral components; reducing the capacitance of the receivers; and removing interference from at least one of the spectral components. The receiver system may be configured to select which of the receivers provides the electrical signal based on whether or not the electrical signal generated at the at least one receiver is above or below the threshold.

Providing the optimum signal to noise ratio may comprise selecting at least one of the receivers to provide at least one electrical signal e.g. for decoding purposes, or the like. Detecting at least one spectral component or detecting an intensity ratio of detected spectral components may comprise selecting at least one of the receivers to provide at least one electrical signal e.g. for decoding purposes, or the like. Reducing the capacitance of the receivers may comprise selecting at least one receiver that may be used for providing at least one electrical signal e.g. for decoding purposes, or the like, and selecting at least one receiver that may not be used (e.g. switched off, or the like). By selecting only one or some of the receivers to be used or active for providing at least one electrical signal, the number of active receivers may be reduced, which may reduce the capacitance of the receiver system, which may increase the bandwidth thereof. Removing interference from at least one of the spectral components may comprise selecting at least receiver that may be used for providing at least one electrical signal e.g. for decoding purposes, or the like, and selecting at least one receiver that may not be used (e.g. switched off, or the like). By selecting only one or some of the receivers to be used or active for providing at least one electrical signal, receivers or spectral components comprising interference may be switched off or ignored such that interference may be reduced or removed.

The circuitry and/or software may be configured to deactivate at least one of the receivers or ignore the electrical signal from at least one of the receivers so as to select which of the at least one receivers remains active for generating the at least one electrical signal.

The receiver system may be configured to switch off or ignore the electrical signal generated by at least one of the receivers. The receiver system may be configured to switch off or ignore the receivers for which the one or more signal properties are below the threshold.

The receiver system may comprise a photovoltaic or solar panel.

According to an example of the present disclosure there is provided a transceiver. The transceiver may comprise at least one feature of the receiver system according to any example of the present disclosure.

According to an example of the present disclosure there is provided an internet-connected portable electronics device, internet of things device or wearable device. The internet-connected portable electronics device, internet of things device or wearable device may comprise at least one feature of the receiver, receiver system or transceiver according to any example of the present disclosure.

According to an example of the present disclosure there is provided an optical wireless communications system comprising at least one feature of the receiver system or transceiver according to any example of the present disclosure.

The optical wireless communications system may comprise a transmitter system for transmitting a wireless optical signal comprising a plurality of spectral components encoded with information.

The transmitter system may comprise a transmitter. The transmitter may comprise a light or electromagnetic radiation source. The transmitter may be capable of modulating at least one spectral component of the light or optical source.

At least one spectral component of the transmitter system may be modulated independently of at least one other spectral component of the transmitter system. A plurality of spectral components of the transmitter system may be modulated simultaneously or collectively.

The transmitter system may comprise at least one of: an LED, an RGB transmitter, an RGB based LED, a white LED, an infrared LED, an ultraviolet LED, a solid state light source, a laser, a phosphorescent material pumped by an LED or laser, a photonic array, an optical phased array, a fibre-based light source, a semiconductor-based light source, a fluorescent light source, or any other light source which can be modulated (e.g. intensity modulated). At least one of or each of the spectral components may be intensity modulated, for example, independently or simultaneously of each other so that one of or each of the spectral components may be encoded with data or information.

The transmitter system may comprise a lighting system for generating at least one visible frequency of electromagnetic radiation. The transmitter system may comprise a lighting system for generating at least one non-visible frequency of electromagnetic radiation. The electromagnetic radiation may comprise at least one of: visible and non-visible electromagnetic radiation. The transmitter system may be configured to produce visible, ultraviolet, infrared, X-ray, microwave, Terahertz, or gamma ray radiation, or the like.

In an example, the transmitter system may be provided as part of a lighting system, which may provide a dual functionality system for providing lighting and data/information transmissions. In another example, the transmitter system may not be used for lighting, for example, for providing data/information transmissions.

The optical wireless communications system may comprise a processor for encoding information from an input data signal using a modulation scheme. The input data signal may comprise an input electrical data signal.

The processor may comprise a modulator for modulating spectral components or bands of the transmitter system. The modulation scheme may comprise any appropriate technique described in the present disclosure, or indeed any other appropriate modulation technique. The transmitter system may be configured to be modulated by an electrical signal generated by the modulation scheme. The processor may be operable to individually modulate spectral components of the transmitter system.

The input data signal may comprise or encode data, such as digital data, or have digital data encoded on the signal, e.g. using techniques such as M-QAM, OOK, PAM, and/or the like.

The modulation scheme may be configured to transmit orthogonal subcarriers. The modulation scheme may comprise any appropriate implementation of orthogonal frequency domain multiplexing (OFDM), or indeed any other appropriate modulation scheme. The potential implementations of OFDM may comprise, but are not limited to, one or more of: DCO-OFDM, ACO-OFDM, eACO-OFDM, LACO-OFDM, PAM-DMT, ePAM-DMT, U-OFDM, eU-OFDM, Flip-OFDM, SEE-OFDM, RPO-OFDM, P-OFDM, spatial-OFDM, ASCO-OFDM, SFO-OFDM, PM-OFDM, ADO-OFDM, HACO-OFDM, or the like. The modulation scheme may be configured to transmit orthogonal subcarriers via one or more than one of the spectral components. The modulation scheme may be configured to transmit a plurality of orthogonal subcarriers on one/each of the spectral components. Providing more than one spectral component may permit more than one set of orthogonal subcarriers to be transmitted or simultaneously transmitted (e.g. for increasing the available bandwidth for transmitting data or information).

According to an example of the present disclosure there is provided a method for converting a wireless optical signal comprising a plurality of spectral components encoded with information into an electrical signal. The method may comprise receiving at least one spectral component on at least one receiver; and receiving at least one different spectral component on at least one other receiver.

The method may comprise converting the optical signal into at least one electrical signal. At least one or each electrical signal may be generated by at least one received spectral component.

The method may comprise spectrally filtering the optical signal. The method may comprise generating at least one electrical signal using the spectrally filtered optical signal.

The method may comprise using at least one photovoltaic element to convert the optical signal into at least one electrical signal.

The method may comprise simultaneously receiving data or information and generating electrical energy and/or power, e.g. for powering the receiver system and/or a device coupled or connectable to the receiver system and/or energy storage.

The method may comprise operating in at least one of: a first mode and a second mode, wherein in the first mode the method may comprise receiving data or information from at least one of the spectral components. In the second mode, the method may comprise harvesting energy or power. The method may comprise converting a received signal into an electrical signal such as for energy storage or powering another component or device coupled or connectable to the receiver system and/or energy storage.

The method may comprise operating in a third mode. The method may comprise operating in a combination of the first and second modes for simultaneously receiving information (e.g. which may be encoded by at least one of the spectral components provided by the optical signal) and energy/power harvesting. The method may comprise switching between the first and second modes. The method may comprise operating in a combination of the first and second modes.

The method may comprise separating at least one spectral component from at least one other spectral component of the optical signal.

The method may comprise directing at least one spectral component of the optical signal in a first direction. The method may comprise directing at least one other spectral component of the optical signal in a different second direction.

The method may comprise directing separated spectral components to at least one of the receivers so as to collect at least one of or all of the separated spectral components of the optical signal.

The method may comprise recovering data or information from the electrical signal by implementing a demodulation scheme.

The demodulation scheme may be in accordance with any modulation and/or demodulation scheme described in the present disclosure.

The method may comprise performing error correction on at least one electrical signal by comparing the at least one electrical signal with at least one other electrical signal.

The method may comprise selecting at least one electrical signal. The selection may be based on at least one of: providing an optimum signal to noise ratio; detecting at least one spectral component or detecting an intensity ratio of detected spectral components; reducing capacitance of at least one receiver for receiving the optical signal; and removing interference from at least one of the spectral components.

The method may comprise deactivating at least one of the receivers or ignoring the electrical signal from at least one of the receivers so as to select which at least one receiver is active for generating the at least one electrical signal.

The method may comprise modulating an electrical signal for modulating an optical output of a transmitter.

The method may comprise encoding data or information from an input data signal by implementing a modulation scheme. The input data signal may comprise an input electrical data signal.

The modulation scheme may be in accordance with any modulation/demodulation scheme described in the present disclosure.

According to an example of the present disclosure there is provided a computer program product that when executed by a processing system or control unit causes the processing system or control unit to at least partially implement the method according to any example of the present disclosure.

The processing system or control unit may comprise a processor and a memory. The processing system or control unit may comprise a communications module, such as a wireless and/or wired communications module. The memory may be configured to store at least part of the computer program product. The control unit may be coupled or in communication with at least one input device or user input device and/or at least one output or user output device. Examples of suitable user input devices include, for example, a keyboard, mouse, trackball, switch, touch screen or contact pad such as a capacitive or inductive touch screen or contact pad, optical and/or camera based input system and/or the like. Examples of suitable output or user output devices include a display, screen, led, speaker or other audio output, haptic output device, a virtual reality headset, a data store, a network, a remote server, and/or the like.

The computer program product may be provided on a carrier medium. The carrier medium may be a tangible, non-transient carrier medium, such as a flash drive, memory stick, optical disk or carrier, magnetic disk or carrier, memory, ROM, RAM, and/or the like. The carrier medium may be, comprise or be comprised in a non-tangible carrier medium such as an electromagnetic wave, electronic or magnetic signal, digital data and/or the like.

In addition, it will be well understood by persons of ordinary skill in the art that whilst some examples or embodiments may implement certain functionality by means of a computer program having computer-readable instructions that are executable to perform the method of the embodiments, the computer program functionality could be implemented in hardware (for example by means of a CPU or by one or more ASICs (application specific integrated circuits), FPGAs (field programmable gate arrays) or GPUs (graphic processing units)) or by a mix of hardware and software.

At least one feature of any example, aspect or embodiment of the present disclosure may replace any corresponding feature of any example, aspect or embodiment of the present disclosure. At least one feature of any example, aspect or embodiment of the present disclosure may be combined with any other example, aspect or embodiment of the present disclosure.

At least one feature of any example, aspect or embodiment of the present disclosure may replace any corresponding feature of any example, aspect or embodiment of the present disclosure. At least one feature of any example, aspect or embodiment of the present disclosure may be combined with any other example, aspect or embodiment of the present disclosure.

BRIEF DESCRIPTION OF THE DRAWINGS

These and other aspects or examples of the present disclosure will now be described with reference to the following drawings, in which.

DETAILED DESCRIPTION OF THE DRAWINGS

Figure 1:
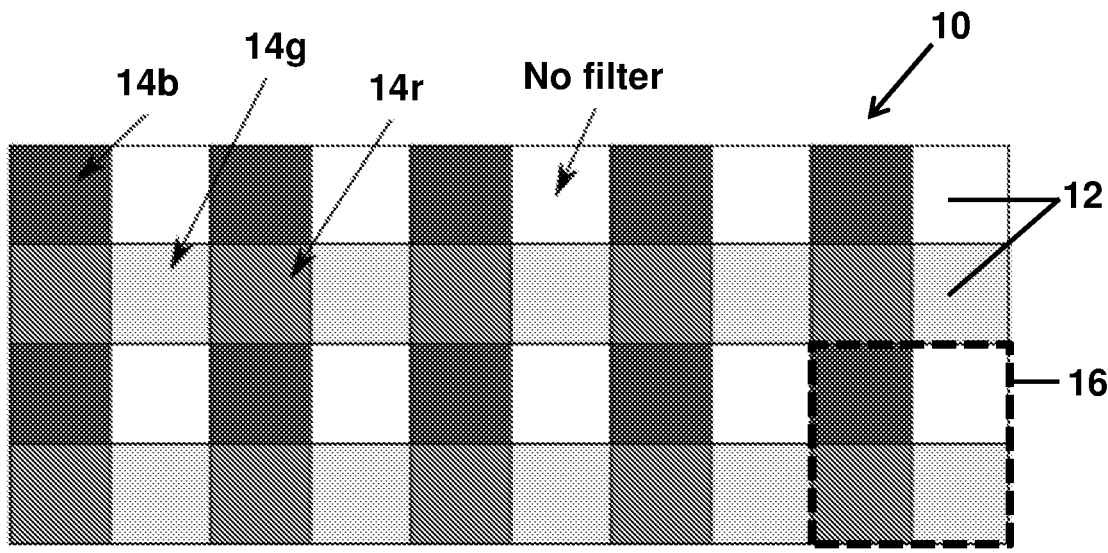
FIG. 1 is a schematic illustration of a photovoltaic panel according to an example of the present disclosure.

FIG. 1 illustrates a photovoltaic (PV) panel 10 including an array of photovoltaic (PV) elements 12. Each PV element 12 is stand alone and can be electronically addressed individually. The PV panel 10 is configured such that different subsets of PV elements 12 receive different spectral components. In this example, the PV panel 10 includes a number of spectral filters 14, in this example, a red filter 14r, a green filter 14g and a blue filter 14b arranged over some of the PV elements 12 to selectively pass the red, green and blue spectral components from white (combined red, green and blue) light emitted from a red-green-blue (RGB) transmitter (not shown). The PV elements 12 may be considered as individual receivers such that the filtered PV elements 12 correspond to RGB receivers and the non-filtered PV elements 12 correspond to white receivers (i.e. due to the combination of RGB light representing white light).

The filters 14 are arranged in a square-array pattern such that a square portion 16 (highlighted by a dashed line in FIG. 1) of four individual square PV elements 12 is responsive to (and can distinguish between) red, green, blue and white light. The white light-responsive PV element 12 is not covered by the spectral filters 14 and can be used to harvest energy from incident light and/or for error correction purposes. In the present example, four square PV elements 12 are arranged together as the square portion 16 and operate to receive red, green, blue and white light, the particular shape, pattern or configuration of the PV elements 12 is not limited in any way. For example, only some but not all of the red, green, blue and white PV elements could be provided and/or the absolute or relative sizes, positions, shapes, or the like of the PV elements 12 and/or the proportions of each spectral component capable of being detected by the PV elements 12 can differ or be varied in any appropriate way. In a particular example, one or more or each of the PV elements that pass a colour may be a different size to one or more or each of the other PV elements that pass different colours.

The PV panel 10 may be configured as a combined power supply and receiver for an optical wireless communications system to provide simultaneous reception of optical wireless communications data and light harvesting for powering connected devices.

For example, the PV panel 10 can be configured to be multifunctional in that one or more or each of the PV elements 12 can be used to receive information encoded by at least one of the spectral components as well as harvesting energy from the light.

In an optional example, the PV panel 10 can be operated in one of several modes for providing the multifunctionality. In a first mode, the PV panel 10 can be solely used for receiving information from at least one of the spectral components. In a second mode, the PV panel 10 can be solely used for harvesting energy/power by converting received light into an electrical signal for energy storage or powering purposes. In a third mode, the PV panel 10 can operate in a combination of the first and second modes for simultaneously receiving information and energy/power harvesting.

The PV elements 12 are operable to produce an electrical signal in response to being illuminated by an optical signal. Since each PV element 12 is individually addressable, the PV elements 12 that produce an electrical signal will provide at least one separate or separable electrical signal. This electrical signal carries energy (e.g. in the form of voltage and current) and may also be encoded with information if the optical signal is also encoded with information.

There are a variety of possible approaches for achieving the combined power and data receiving functionalities of the PV panel 10. For example, the PV elements 12 that pass one or more of the colours or the white light receiving PV elements 12 can be used for power, whilst the PV elements associated with other colours can be used to receive data. Alternatively or additionally, by summing/combining the energy/power provided by the PV elements 12, energy can be harvested e.g. for powering a component, self-powering the PV panel, or for energy storage e.g. in a battery, or the like. The electrical signals can be summed/combined in series, or in parallel, or in any other appropriate way so as to permit energy/power to be harvested with a desired current-voltage characteristic. Either all of the PV elements 12 or some of the PV elements 12 may be connected in series or in parallel combinations. Depending on the particular mode of operation, information encoded by the electrical signals can be also processed to allow data to be received by the PV panel 10 e.g. for wireless optical communications. However, it will be appreciated that other ways of extracting data signals from the electrical signal so as to provide both data reception and power supply that could be used.

A light beam from the RGB transmitter may only need to cover at least three, but preferably four, PV elements 12 at a time in order to allow data to be transmitted using each of the available RGB spectral components as well as making use of the white light-responsive PV element 12. It will be appreciated that one or more of the spectral components can be used for conveying information at any one time providing the appropriate spectral filter(s) are provided.

In use, data is simultaneously encoded on the different spectral components (i.e. data can be transmitted on each of the red, green and blue spectral components provided by the RGB transmitter). By providing more than one spectral component, it may be possible to increase the spectral bandwidth, and hence increase the efficiency of data transmissions.

The structure of the PV panel 10 can be used in a number of different ways to facilitate data transmission in an optical wireless communications system, as well as potentially optimising or improving the data transmission rate.

Figure 2:
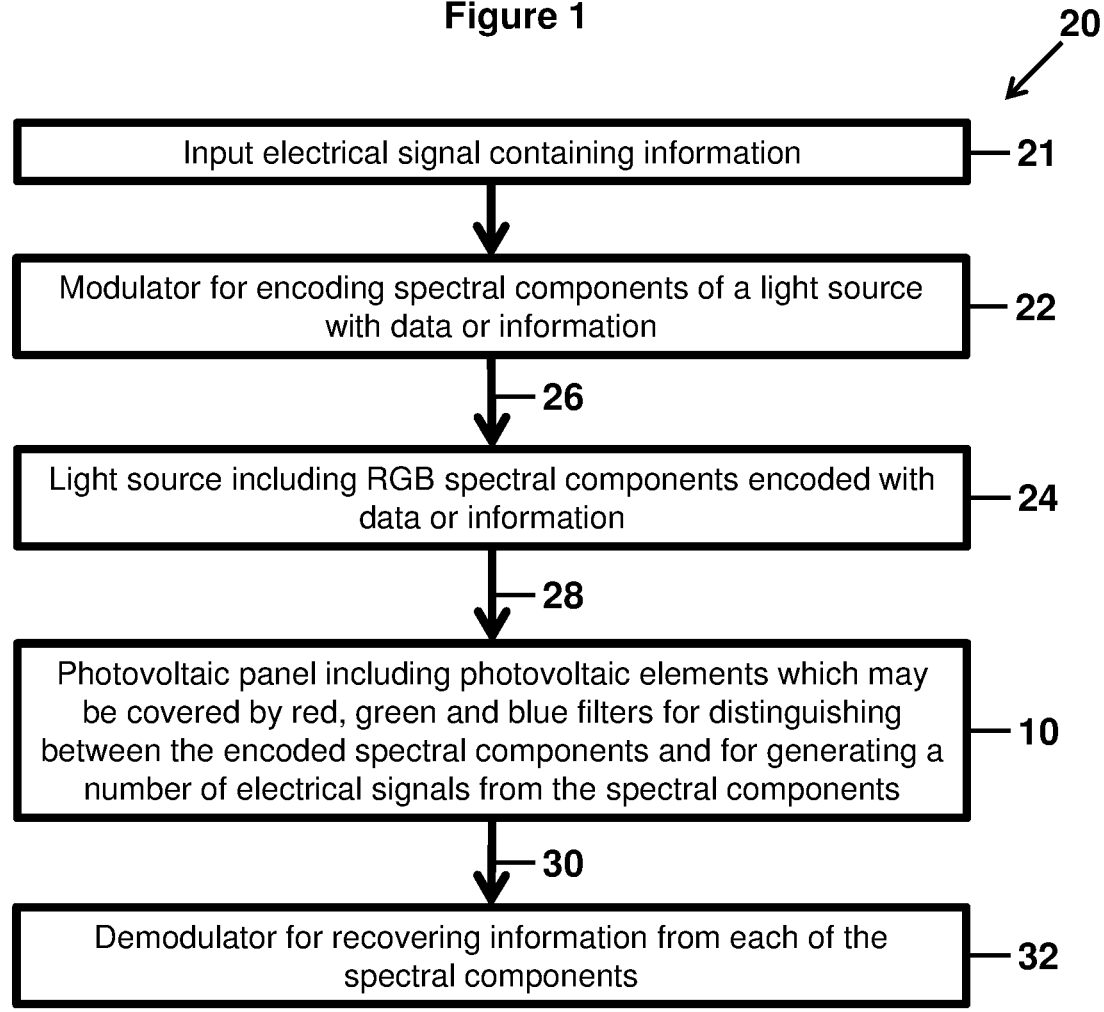
FIG. 2 is a schematic illustration of an optical wireless communications system including the photovoltaic panel of FIG. 1.

In the example illustrated by FIG. 2, there is an optical wireless communications system 20 including the PV panel 10 of FIG. 1. The PV panel 10 represents the receiver of the communications system 20. The communications system 20 includes a modulator 22 for encoding spectral components of a light source 24 (e.g. an RGB transmitter) with data or information. The light source 24 represents a transmitter of the communications system 20. An input electrical data signal 21 containing information is processed by the modulator 22, which outputs the data or information in the form of one or more modulated electrical signals 26 encoded with the data or information using any appropriate modulation scheme, as described herein. The input electrical data signal 21 may include symbols encoded using an M-QAM modulation scheme for subcarrier modulation in the frequency domain, although it will be appreciated that other suitable modulation schemes may be optionally used. The symbols may be encoded using 4-QAM or higher modulation (e.g. 8-QAM, 16-QAM and upwards).

The modulated electrical signal(s) 26 controls the light source 24 such that an optical signal 28 produced by the light source 24 is optically modulated (e.g. intensity modulated) so as to transmit the information optically to the PV panel 10. The light source 24 includes red, green and blue spectral components, each of which can be used to transmit information encoded by the modulated electrical signal 26. Each of the spectral components can be used to transmit information independently of the other spectral components since the PV panel 10 can distinguish between the spectral components. In the present example, the spectral components can be distinguished as the PV panel 10 includes photovoltaic elements 12 which may be covered by red, green and blue filters 14r, 14g, 14b (see e.g. FIG. 1) for distinguishing between the encoded spectral components and for generating a number of electrical signals from the spectral components. However, other means for distinguishing between spectral components other than filters 14 could be used, non-limiting examples of which include dichroic mirrors, prisms, gratings, beam splitters and other suitable optical elements. Optionally, the modulator 22 is configured to divide the information comprised in the input data signal 21 into parts and provide different parts of the information on different modulated electrical signals 26. The modulator 22 may alternatively or additionally receive multiple input data signals 21, e.g. for different users, and encode the information from different input data signals 21 into different modulated signals 26. Each modulated signal 26 can be transmitted on a different spectral component.

The red, green and blue spectral filters 14 of the PV panel 10 distinguish between the modulated optical signal 28 transmitted using each spectral component. Since each PV element 12 is individually addressable, information encoded on each of the spectral components can be independently converted into a photovoltaic (PV) electrical signal 30 from the PV elements 12 corresponding to the appropriate spectral component. The information encoded within the PV electrical signal 30 is recovered using a demodulator 32. The demodulator 32 processes the PV electrical signal 30 in any appropriate manner, for example by sending the information for further processing by software and/or circuitry of the communications system 20.

Figure 3:
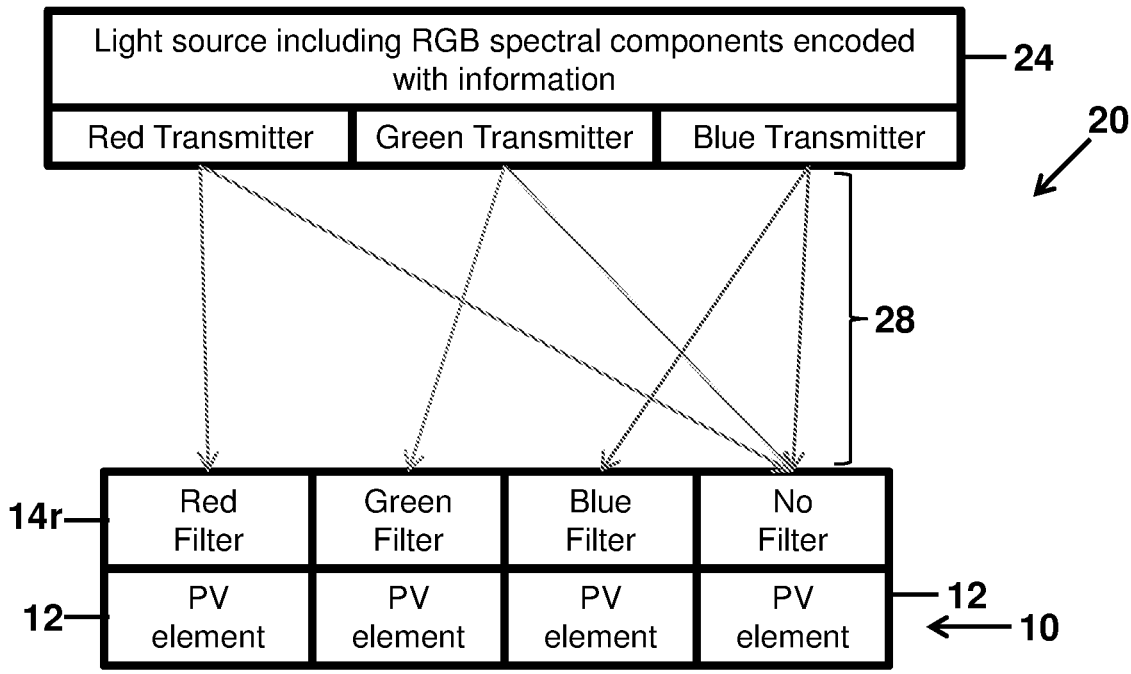
FIG. 3 is a schematic illustration of part of the optical wireless communications system of FIGS. 1-2.

As illustrated by FIG. 3, which illustrates part of a wireless optical communications system 20, the provision of the three spectral filters 14 (see FIG. 1) combined with the non-filtered PV element 12 effectively provides four unique receivers which can each independently receive information by appropriate modulation of the optical signal 28 carried on each of the spectral components. The effectively four different spectral components can be used for traditional (multi-stream) multiple-input multiple-output (MIMO) communications, thereby potentially multiplying the bandwidth by a factor of four. By providing additional spectral filters 14 covering a number of spectrally distinct bands, as well as providing a transmitter capable of modulating the optical signal 28 in each of these spectral bands, it is possible to further increase the effective bandwidth.

It is also possible to extend the symbol constellation representing the information into the spectral (e.g. colour) dimension as well as using the spectral components to transmit data.

Since the PV panel 10 is capable of distinguishing between the different spectral components, each of which may individually carry information, it is possible to implement any appropriate form of colour domain modulation in the communications system 20, for example, colour shift keying (CSK), colour intensity modulation (CIM) and metameric modulation (MM), or the like (see e.g. Islim, M & Haas, H 2016, *"Modulation Techniques for Li-Fi", ZTE Communications*).

In this example, specific combinations of spectral components can be used to represent data values. A particular symbol or data portion is sent by selecting a combination of the different spectral components on which to transmit e.g. other data, wherein the specific combination of spectral components used to transmit (e.g. the other data) is indicative of the particular symbol or data portion. In the case of an RGB transmitter the different combinations of spectral components provides a dimensionality of seven. Providing the non-filtered PV elements 12 allows for energy harvesting or additional energy harvesting as well as using the additional signal for better received symbol estimation. However, the filtered PV elements 12 may still be used for energy harvesting and, even though the PV elements 12 are individually addressable, they may be combined in any appropriate way, e.g. in parallel or in series, to allow energy to be harvested from at least one of the PV elements 12 (whether or not these are filtered) to provide an electrical signal with desired current-voltage characteristics.

In the example where quadrature amplitude modulation (QAM) is used to modulate the information, the capacity per symbol can be increased. For example, the capacity per symbol for 4 QAM is more than doubled, and approaches that of 32 QAM. The capacity for a traditional 16 QAM constellation extended to the colour dimension approaches that of traditional 128 QAM. This potentially has a significant implication on the required signal to noise ratio (SNR) for decoding as well. This modulation techniques and receiver design lends themselves readily to long distance communication where alignment and received signal power are limiting factors.

Compared to multi-stream MIMO, the capacity is lower, however the receiver complexity is lower as well, which may provide a degree of flexibility in terms of the trade-off between data capacity and complexity.

The design of the PV panel 10 can be varied in terms of number of different wavelengths (spectral components), the fill factor of the filtered PV elements 12, the topology in terms of how the different filtered PV elements 12 are positioned, as well as the way in which the symbol constellation is extended in the colour dimension.

Figure 4:
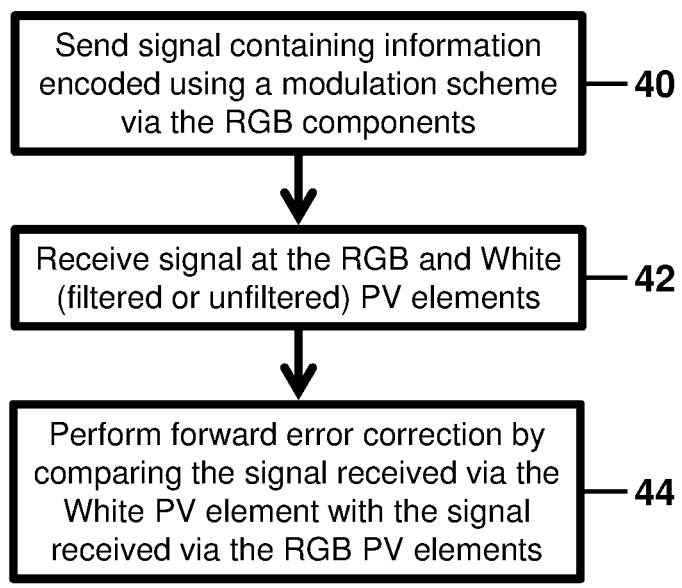
FIG. 4 illustrates a method of performing forward error correction according to an example of the present disclosure.

It is also possible to use the light detected by the unfiltered PV elements 12 in combination with the optical signal 28 received by the filtered PV elements 12 to implement a form of forward error correction (FEC). Since the RGB spectral components may each contain information, the combination of these components in the combined "white" component may contain corresponding information for recognising any apparent errors in the RGB spectral components. The extra component can thus be used in the decoding process to improve the bit error rate (BER) performance. This method may reduce the over the air overhead in the communications system 20. FIG. 4 illustrates an example implementation of this method in which in a first step 40 an optical signal containing information encoded using any appropriate modulation scheme is sent via the RGB components (i.e. using an RGB transmitter). In a second step 42, the optical signal is received at the RGB and White (i.e. filtered or unfiltered, respectively) PV elements 12, which may be considered to represent the "RGB" and "White" receivers. In a third step 44, forward error correction is performed by comparing the signal received via the White (unfiltered) PV element 12 with the signal received via the RGB (filtered) PV elements 12. For example, the information received by the white receiver includes information encoded on the red, green and blue spectral components. The electrical signal generated by the white receiver may be deconvolved into an electrical signal that is representative of the individual red, green and blue spectral components. By comparing the signal generated by the white receiver with the other receivers, it may be possible to correct any errors in any of the electrical signals. In an example, it is possible to utilise the multiple spectral components to allow simultaneous transmission of data across each of the spectral components e.g. for a diversity scheme to increase reliability of the data transmission. Thus, implementing any of these or other appropriate methods may allow for correction of any errors which have been introduced to the information-containing signal.

Since all of the PV elements 12 are individually addressable, it is possible to control which (and the number) of the PV elements 12 are configured to contribute to the signal detection at any given time. An example method for controlling the PV elements 12 is to only use the PV electrical signal 30 generated by the individual PV elements 12 which are in fact receiving part of the optical signal 28 (or receiving at least some minimum amount of the signal in order to keep noise down).

Figure 5:
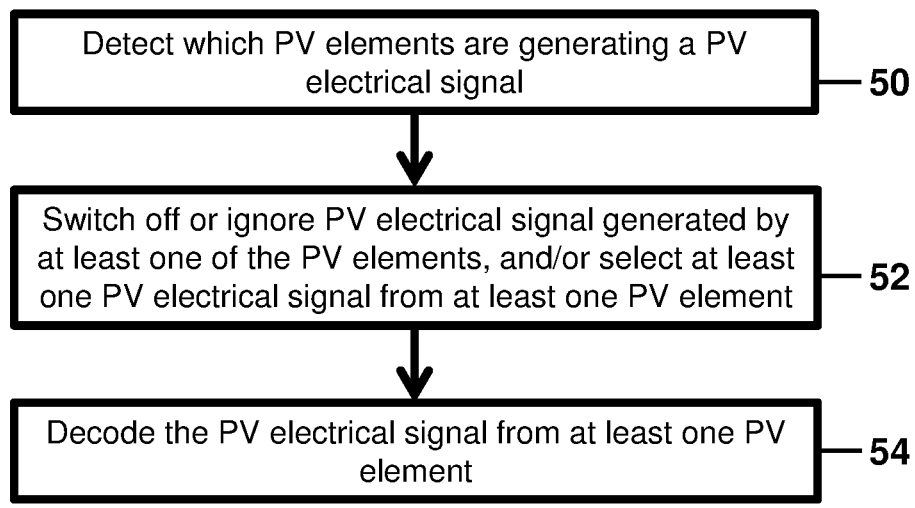
FIG. 5 illustrates a method of optimising bandwidth in the optical wireless communications system of FIGS. 1-2.

FIG. 5 illustrates an example implementation of a method for optimising bandwidth in the communications system. In a first step 50, the method detects which PV elements 12 are generating a PV electrical signal e.g. by comparison of one or more signal properties, such as voltage or current with a threshold. In a second step 52, the method switches off or ignores the PV electrical signal generated by at least one of the PV elements 12 e.g. those for which the one or more signal properties are above or below the threshold, and/or selects at least one PV electrical signal from at least one PV element 12. In a third step 54, the method decodes the PV electrical signal from at least one PV element (e.g. such as those that have been selected or those that have not been switched off or ignored), for example by determining the relevant signal based on only the PV elements which provide a PV electrical signal that is above (or below) the threshold (e.g. such as those PV electrical signals having an optimum or minimum SNR). It will be appreciated that in an example, it may not be necessary to switch off or ignore a generated PV electrical signal so as to avoid excluding any PV electrical signals.

The method can be implemented in analogue conditioning circuitry (i.e. associated with the PV panel 10, or any other electronics), or in terms of a higher level part of firmware which monitors the decoding statistics such that the active PV elements 12 can be optimised to increase the available bandwidth.

If there is any interference in the system, e.g. between the different spectral components or within any of the spectral components, a similar method may be implemented to switch off or ignore PV electrical signals that are subject to interference. By detecting interference between spectral components e.g. due to the provision of multiple receivers (i.e. PV elements 12) generating electrical signals that interfere, it is possible to switch off or ignore the signal from any of the PV elements 12 so as to tune out the interference.

This method may allow the communications system to maintain the highest amount (or optimum amount) of bandwidth by minimising the total detection area so as to reduce the capacitance in the PV panel 10.

Figure 6:
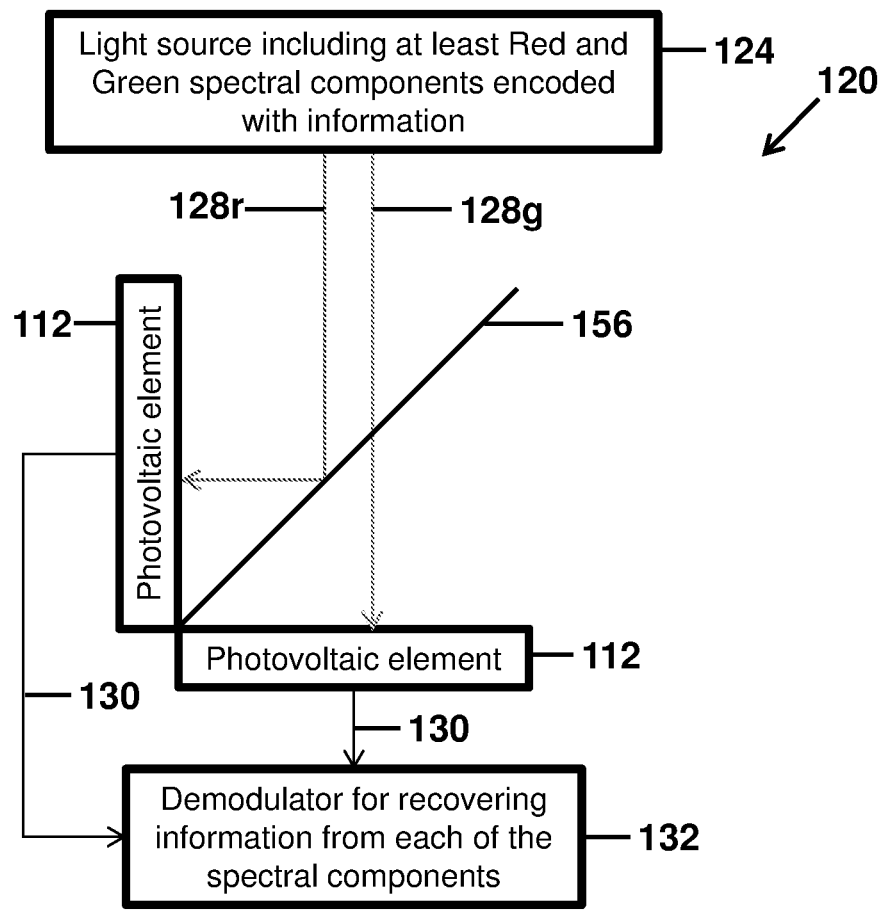
FIG. 6 is a schematic side view of a receiver including an optical element for separating spectral components of an optical signal according to an example of the present disclosure.

FIG. 6 illustrates part of a wireless optical communications system 120. The wireless optical communications system 120 is similar to the communications system illustrated by FIGS. 2-3. Like or similar features are denoted with reference numerals incremented by 100 compared with the corresponding features of the wireless optical communications system 20 illustrated by FIGS. 2-3. Further/alternative features of the communications system 120 are described below.

The wireless optical communications system 120 includes a light source 124 for providing an optical signal 128. In this example, the optical signal 128 includes at least red spectral component 128r and a green spectral component 128g, each of which can be encoded with information. It will be appreciated that any other combination of spectral components may be used. Whilst the embodiment shown in FIG. 1 uses spectral filters 14 to selectively provide different spectral components to different subsets of PV elements 12, other means for doing this could be used. For example, in the present embodiment, the optical signal 128 is incident on a dichroic mirror 156 that is configured to separate the red and green spectral components 128r, 128g. In this example, the red spectral component 128 is reflected towards a PV element 110, whilst the green spectral component 128g is transmitted through the dichroic mirror 156 to another PV element 110. Optionally, the PV element that receives the red spectral component 128 is angled, e.g. disposed perpendicularly relative to the PV element 110 that received the green spectral component 128g. Each PV element 110 is individually addressable to provide a PV electrical signal 130 for demodulation by a demodulator 132 for recovering information from each of the spectral components. The present example may allow for more efficiency energy harvesting because the dichroic mirror 156 ensures that most or all of the energy of the optical signal 128 is directed one of the PV elements 12 and is not substantially absorbed by the dichroic mirror 156. In this example, there are no absorbing filters, which may increase the efficiency of energy harvesting.

Figure 7:
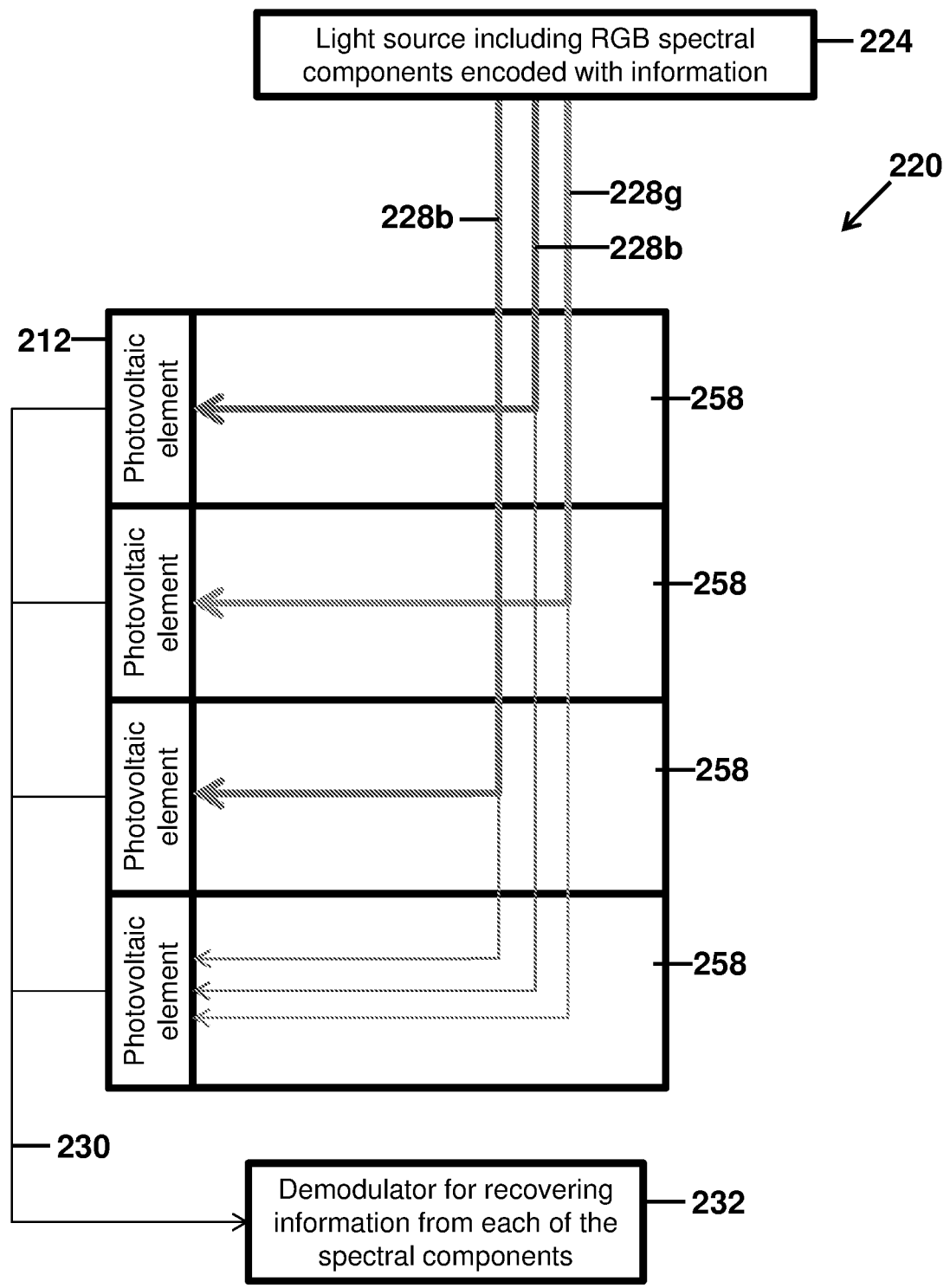
FIG. 7 is a schematic side view of a receiver including an optical element for separating spectral components of an optical signal according to an example of the present disclosure.

FIG. 7 illustrates part of a wireless optical communications system 220. The wireless optical communications system 220 is similar to the communications system 120 illustrated by FIG. 6. Like or similar features are denoted with reference numerals incremented by 100 compared with the corresponding features of the wireless optical communications system 120 illustrated by FIG. 6. Further/alternative features of the communications system 220 are described below.

The wireless optical communications system 220 includes a light source 224 for providing an optical signal 228. In this example, the optical signal 228 includes a red spectral component 228r, a green spectral component 228g, and a blue spectral component 228b, each of which can be encoded with information. The optical signal 228 is incident on, or can be transmitted between, one or more of four optical elements 258 disposed on four adjacent PV elements 212. The optical elements 258 act to concentrate the incident optical signal 228 by collecting the incident optical signal 228 over a first larger area and confining an emitted optical signal within a second relatively smaller cross-sectional area of the optical element 258.

In this example, the optical signal 228 is incident on a first of the optical elements 258 for separating the blue spectral component 228b from the rest of the spectral components 228r, 228g so that the blue spectral component 228b is directed towards a first PV element 212. The rest of the spectral components 228r, 228g are transmitted through the first optical element 258 towards a second of the optical elements 258 for separating the green spectral component 228g, which is directed to a second of the PV elements 212, from the red spectral component 228r, which is transmitted to a third of the optical elements 258 for directing the red spectral component 228 to a third of the PV elements 212. Any remaining optical signal 228 that includes at least one of the spectral components 228r, 228g, 228b that has not been separated by one of the first to third optical elements 258 may be transmitted to a fourth optical element 258, which is configured to concentrate any remaining signal into a fourth PV element 212 e.g. for energy harvesting and/or error correction purposes, or the like. The communications system 220 further includes a demodulator 232 for recovering information from a PV electrical signal 230 produced by at least one of the spectral components detected by at least one of the PV elements 212.

A person of ordinary skill in the art will recognise that the proportion of signal transmitted through the optical elements 258 may depend on a number of factors including, but not limited to, absorption rate, angle of incidence, refractive index, and the like. Thus, it may not always be possible for all of the PV elements 212 to receive a signal and/or there may be a portion of unwanted signal from another of the spectral components arrive at a PV element 212 that is configured to receive a different spectral component. The present example may provide a way to increase signal to noise ratio of the detected signal by providing an efficient way to capture the optical signal 228. Further, concentrating the optical signal 228 may provide a more efficient energy harvesting system compared with the case where there are no optical elements 258.

It will be appreciated that any of the examples described herein may be modified, adapted or combined with any other example in any appropriate way. For example, although a number of the examples describe use of red, green and blue spectral components, a person of ordinary skill in the art will appreciate that any part of the visible or non-visible (e.g. ultraviolet or infrared radiation) electromagnetic spectrum may provide at least one of the spectral components of the optical signal. In addition, although various example above describe different means, such as spectral filters, dichroic elements and concentrators and other elements, for selectively providing different spectral components to different subsets of PV elements, other means for providing selectivity of spectral components for different subsets of PV elements could be used, such as prisms, gratings, and/or the like.

For the avoidance of doubt, the term "spectral component" of the wireless optical signal may represent a variable (e.g. a spectral frequency or a range of spectral frequencies) of the wireless optical signal used to distinguish a communications channel or a part of the incoming optical signal at the receiver system, e.g. by allowing different parts of the optical signal to be selectively received by specific receivers. It will be appreciated that this is not to be confused with a "frequency subcarrier", represented in baseband, which may be used as part of a modulation scheme such as OFDM, or the like. The wireless optical signal may be modulated (e.g. at least one of the "spectral components" may be intensity modulated) using the data or information that has been encoded using the modulation scheme.

The invention claimed is:

1. An optical communications receiver system for converting an optical communications data signal received from an optical wireless communications transmitter and comprising a plurality of spectral components encoded with data into an electrical signal such that different data is encoded on different spectral components of the optical communications signal; the receiver system comprising:
a plurality of receivers for converting the optical communications data signal into the electrical signal, wherein the receiver system comprises either:
a spectral filtering system comprising a plurality of filters for allowing transmission of a predetermined spectral component or spectral band, wherein respective filters from the plurality of filters are located on or over respective receivers of the plurality of receivers so as to allow one or more of the spectral components of the optical communications signal that encode the different data to be detected by at least one of receivers; or
an optical concentrator configured to concentrate at least one spectral component of the optical communications signal received over a first area of the optical concentrator to a second area smaller than the first area and separate the at least one spectral component of the optical communications signals that encodes the data from at least one other spectral component of the optical communications signal that encodes different data;
such that at least one of the receivers detects at least one different spectral component of the optical communications signal that encodes the different data to the data encoded by spectral component(s) of the optical communications signal detected by at least one other of the receivers.

2. The receiver system of claim 1, wherein each receiver of the plurality of receivers comprises a photovoltaic element for generating the electrical signal upon activation by the optical signal and the photovoltaic elements are comprised in a photovoltaic array configured such that different subsets of photovoltaic elements receive different spectral components and in which the receivers are individually operable or addressable to provide at least one electrical signal in response to being illuminated by at least one spectral component of the optical signal.

3. The receiver system of claim 2, configured to simultaneously receive data and to generate electrical power for at least one of: powering the receiver system, powering a device coupled or connectable to the receiver system, and energy storage the receiver system is operable in, and switchable between, at least two of:

a first mode in which at least one of the receivers are operable for receiving data from at least one of the spectral components;

a second mode in which the receiver system is operable for harvesting energy or power by converting a signal received at one or more of the receivers into an electrical signal for at least one of: powering the receiver system; powering the device coupled or connectable to the receiver system; and/or the energy storage; and/or a third mode in which the receiver system is operable to simultaneously receive data encoded by at least one of the spectral components provided by the optical signal and energy/power harvesting.

4. The receiver system of claim 2, wherein the individual photovoltaic elements are controllable to control which of the photovoltaic elements and the number of the photovoltaic elements contribute to signal detection at any given time.

5. The receiver system of claim 1, wherein at least one receiver has a different size, shape, dimension or area to that of at least one other receiver.

6. The receiver system of claim 1, wherein the relative positioning of the receivers is adjustable for optimising detection of at least one spectral component.

7. The receiver system of claim 1, wherein at least one of the receivers comprise a photoactive element configured to be responsive to at least one of the spectral components for directly generating the electrical signal.

8. The receiver system of claim 1, wherein at least one of the receivers is operable to detect at least one of the spectral components, the at least one spectral component comprising at least one visible or non-visible spectral component.

9. The receiver system of claim 1, comprising a processor for recovering information from an electrical signal generated by at least one of the photovoltaic elements.

10. The receiver system of claim 1, comprising circuitry and/or software for performing error correction on at least one electrical signal.

11. The receiver system of claim 1, comprising circuitry and/or software for selecting at least one electrical signal provided by at least one of the receivers, the selection being based on at least one of: providing an optimum signal to noise ratio; detecting at least one spectral component or detecting an intensity ratio of detected spectral components; reducing the capacitance of the receivers; and removing interference from at least one of the spectral components.

12. The receiver system of claim 11, wherein the circuitry and/or software is configured to deactivate at least one of the receivers or ignore the electrical signal from at least one of the receivers so as to select which of the at least one receivers remains active for generating the at least one electrical signal.

13. An internet-connected portable electronics device, internet of things device or wearable device comprising the receiver or receiver system of claim 1.

14. An optical communications system comprising the receiver system of claim 1 and a transmitter system for transmitting an optical signal comprising a plurality of spectral components, wherein at least one of the spectral components is encoded with different data or a different data signal to at least one other of the spectral components.

15. The optical communications system of claim 14, wherein at least one spectral component of the transmitter system is modulated independently of at least one other spectral component of the transmitter system, or wherein a plurality of spectral components of the transmitter system are modulated simultaneously or collectively.

16. The receiver system of claim 1, wherein the different data from the transmitter that is encoded on different spectral components of the optical communications signal comprises digitally encoded data.

* * * * *